Sept. 24, 1929.   F. J. WOOD ET AL   1,729,200
APPARATUS FOR SUPPLYING LIQUIDS IN PREDETERMINED QUANTITIES
Filed Feb. 23, 1928
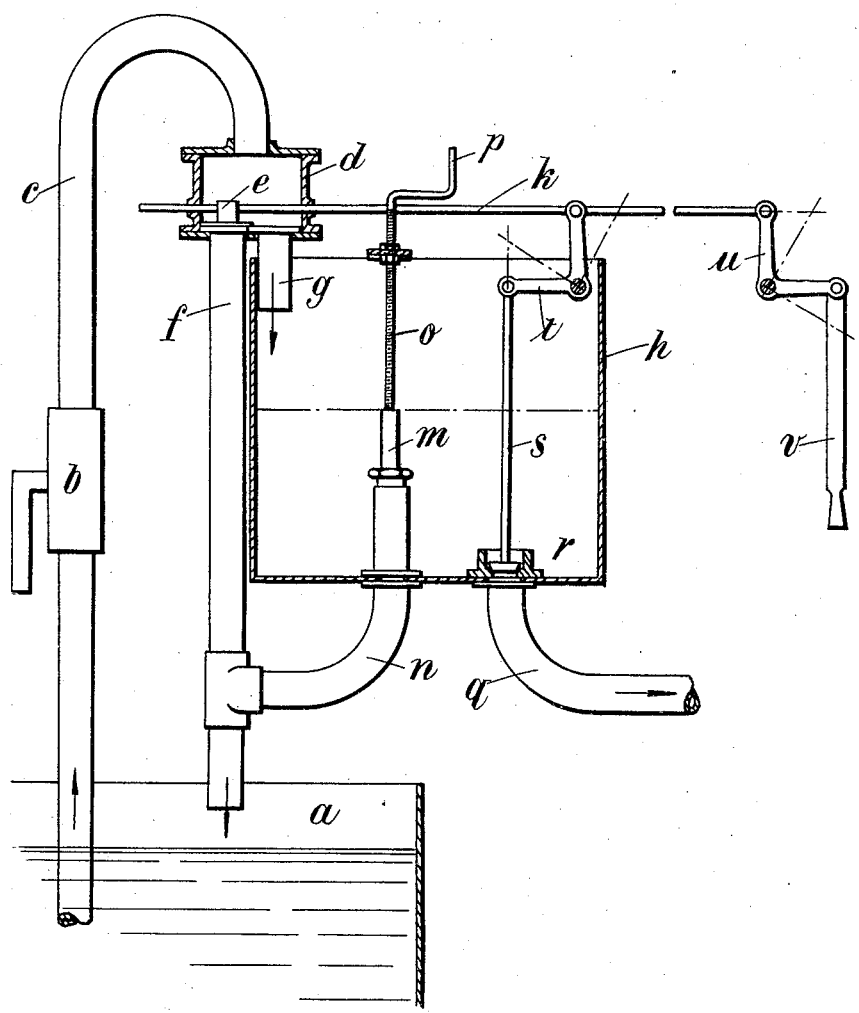
INVENTORS.
FREDERICK JAMES WOOD
JOHN LUCK
BY
ATTORNEYS Patented Sept. 24, 1929

1,729,200

UNITED STATES PATENT OFFICE

FREDERICK JAMES WOOD AND JOHN LUCK, OF HAYWARDS HEATH, ENGLAND

APPARATUS FOR SUPPLYING LIQUIDS IN PREDETERMINED QUANTITIES

Application filed February 23, 1928. Serial No. 256,414, and in Great Britain June 2, 1927.

This invention relates to apparatus for supplying liquids in predetermined quantities for any purpose.

Apparatus according to the present invention comprises a tank adapted to contain only a predetermined quantity of water, the supply to this tank passing through a valve box wherein is contained a governor valve adapted to control the outlets from the box to a bye-pass pipe leading back to the source of water supply and to a second pipe communicating with the tank whereby the predetermined quantity of water in the tank by the simultaneous operation of the governor valve and a valve controlling the discharge from the tank may be discharged from the tank as and when required, the continuous supply to the tank being diverted by the bye-pass pipe back to the source of supply.

The amount of water in the tank is governed by the height of an adjustable overflow pipe whereby any excess over this amount is returned to the source of supply.

The invention is particularly applicable to the intermittent supply of the water required in the mixing of concrete in a mixer and a suitable form of apparatus for this purpose and embodying the invention is somewhat diagrammatically illustrated in the accompanying drawing by way of example. By the apparatus shown therein and hereinafter more particularly described substantially the quantity of water required for each batch may be supplied to the mixer without stopping the running of the pump delivering the water to the mixer water tank thus expediting the supply and at the same time eliminating waste by dispensing with the ball and float control valve commonly employed.

Referring to the drawing it will be appreciated that the water is drawn from a supply tank $a$ that may be fed from the ordinary service main, by a suitable pump $b$ that may be driven for example from the mixer shafts and the delivery of which communicates with a pipe $c$ that leads to a bye-pass valve box $d$ wherein is housed a suitable governor slide valve $e$ controlling the outlet from the box $d$ to the two pipes $f$ and $g$. The pipe $f$, that may be termed the bye-pass pipe, leads into the supply tank $a$ and the pipe $g$ into the mixer water tank $h$ and the slide valve $e$ is so operated by means of the rod $k$ that water passes from the valve box $d$ either through the bye-pass pipe $f$ back to the supply tank $a$ the outlet to the pipe $g$ being closed by the valve $e$ or to the mixer water tank $h$ through the pipe $g$ the outlet to the bye-pass pipe $f$ being shut off by the valve $e$.

An overflow pipe $m$ projects upwardly from the base of the mixer tank $h$ and the lower end of this pipe is in communication by way of a return bend $n$ with the bye-pass pipe $f$. The height of the overflow pipe within the mixer tank $h$ is varied according to the amount of water required for the batch in the mixer and this may be effected by making the pipe $m$ telescopic so that its height within the tank $h$ may be adjusted by suitable means such as a screw-threaded rod $o$ passing to, and operated from, the outside of the mixer tank $h$ by means of a handle $p$.

The pipe $q$ leading from the bottom of the mixer tank $h$ to the mixer is controlled by a valve $r$ the actuating rod $s$ of which is connected to the rod $k$ by means of the bell-crank lever $t$ that may be pivoted on one side of the tank $h$ so that the two valves $e$ and $r$ are simultaneously operated by means of the bell-crank lever $u$ and the handle $v$.

In operation, assuming that the slide valve $e$ is in the position shown closing the outlet from the box $d$ to the pipe $f$, the pipe $g$ is open and the water drawn from the supply tank $a$ by the pump $b$ passes from the valve box $d$ through the pipe $g$ into the mixer tank $h$. When the predetermined quantity of water is in the tank $h$, the amount being fixed as previously indicated by the height of the overflow pipe $m$, the water continuing to flow it overflows through the overflow pipe $m$ and passes by the return bend $n$ back to the supply tank $a$ by way of the bye-pass pipe $f$.

When it is desired to charge the mixer with water the handle $v$ is operated whereby not only is the position of the slide valve $e$ altered to close the pipe $g$ and open the bye-pass pipe $f$ so that the water flows from the valve box $d$ through the pipe $f$ back into the supply tank $a$ but also and simultaneously the valve $r$ is lifted and the predetermined quantity of water in the mixer tank $h$ flows to the mixer through the pipe $q$.

The position of the slide valve $e$ is then reversed by the handle $v$ and the valve $r$ is simultaneously lowered to its seat closing the pipe $q$ and the bye-pass pipe $f$ being closed the water from the supply tank $a$ flows to the mixer tank $h$ until it again contains the quantity of water required to bring the overflow pipe $m$ into operation.

It will be appreciated that the pump $b$ is continuously in operation and that the predetermined quantity of water in the mixer tank $h$ may be passed to the mixer intermittently and as frequently as circumstances dictate.

What we claim is:—

1. Apparatus for supplying liquids in predetermined quantities comprising a tank, a telescopic overflow pipe within said tank, means for adjusting the height of said overflow pipe to ensure a predetermined quantity of liquid in said tank, a pipe supplying said tank, a valve box interposed between said pipe and said tank and having two outlets, a bye-pass pipe leading from one of said outlets to the source of supply and a second pipe leading from the other of said outlets to the interior of the tank, a governor valve in said valve box controlling both of said outlets, a discharge pipe extending from the bottom of the tank, a valve controlling said discharge pipe, means for simultaneously actuating said valve and said governor valve, and means including said overflow pipe whereby any excess over the predetermined quantity in the tank is returned to the source of supply through said bye-pass pipe.

2. Apparatus for supplying liquids in predetermined quantities comprising a tank, a telescopic overflow pipe within said tank, means for adjusting the height of said overflow pipe to ensure a predetermined quantity of liquids in said tank, a pipe supplying said tank, a valve box interposed between said pipe and said tank and having two outlets, a bye-pass pipe leading from one of said outlets to the source of supply and a second pipe leading from the other of said outlets to the interior of the tank, a governor valve in said valve box controlling both of said outlets, a discharge pipe extending from the bottom of the tank, a valve controlling said discharge pipe, means for simultaneously actuating said valve and said governor valve and a pipe connecting said overflow pipe to said bye-pass pipe as and for the purposes described.

In testimony whereof we affix our signatures.

FREDERICK JAMES WOOD.
JOHN LUCK.